US007010107B1

(12) United States Patent
Lee et al.

(10) Patent No.: US 7,010,107 B1
(45) Date of Patent: Mar. 7, 2006

(54) INTERNET CONFERENCE CALL BRIDGE MANAGEMENT SYSTEM

(76) Inventors: Yong Lee, 55 S. Lake Ave., Suite 700, Pasadena, CA (US) 91101; Sachin Ahire, 55 S. Lake Ave., Suite 700, Pasadena, CA (US) 91101

(*) Notice: Subject to any disclaimer, the term of this patent is extended or adjusted under 35 U.S.C. 154(b) by 318 days.

(21) Appl. No.: 10/325,179

(22) Filed: Dec. 20, 2002

(51) Int. Cl.
H04M 3/42 (2006.01)
H04L 12/16 (2006.01)
G06F 15/16 (2006.01)

(52) U.S. Cl. .................. 379/202.01; 709/204; 370/261
(58) Field of Classification Search ........... 379/202.01, 379/203.01, 204.01, 205.01, 206.01; 709/204; 370/260, 261
See application file for complete search history.

(56) References Cited

U.S. PATENT DOCUMENTS

| | | | |
|---|---|---|---|
| 4,086,438 A | 4/1978 | Kahn et al. | |
| 5,619,555 A | 4/1997 | Fenton et al. | |
| 5,883,964 A | 3/1999 | Alleman | |
| 6,035,027 A | 3/2000 | Alleman | |
| 6,192,118 B1 | 2/2001 | Bayless et al. | |
| 6,563,914 B1 * | 5/2003 | Sammon et al. | 379/202.01 |
| 6,714,635 B1 * | 3/2004 | Adams et al. | 379/204.01 |
| 6,798,753 B1 * | 9/2004 | Doganata et al. | 370/260 |
| 2001/0026609 A1 * | 10/2001 | Weinstein et al. | 379/93.01 |
| 2002/0091769 A1 * | 7/2002 | Drozdzewicz et al. | 709/204 |
| 2002/0188680 A1 * | 12/2002 | McCormack et al. | 709/204 |
| 2002/0193093 A1 * | 12/2002 | Henrikson et al. | 455/407 |
| 2003/0002637 A1 * | 1/2003 | Miyauchi et al. | 379/93.01 |

* cited by examiner

Primary Examiner—Benny Quoc Tieu
(74) Attorney, Agent, or Firm—William J. Benman

(57) ABSTRACT

The invention pertains to an Internet conference call bridge management (ICCBM) system and method with which a person (customer) having access to the Internet may efficiently input the contact number of at least one party (call recipient) with whom the customer wants to speak. The ICCBM system then calls the customer, calls the party or parties, and the audio signals are bridged in a manner that optimizes the call signal to noise ratio, minimizes demands placed on computing resources, and provides controls with which the customer may monitor and control the telephonic access of the other participants through the duration of the conference call.

52 Claims, 12 Drawing Sheets

INTERNET CONFERENCE CALL BRIDGE MANAGEMENT SYSTEM

BACKGROUND

The present invention relates to a conferencing system and method. In particular, the invention pertains to a method and system with which a customer may initiate and efficiently moderate and control a telephone call between the customer and one or more additional parties over web-enabled appliances or devices.

The prior art discloses a number of conference calling systems. Many of these prior art systems are enterprise systems that require specialized hardware switching components and/or software running on the systems of call participants. In recent years, web-based conference calling has overcome disadvantages that plagued the prior art systems. These web-based conference calling systems, however, lack some of the advantages of the present invention. In particular, the prior art systems do not provide the flexibility necessary to adapt to the variable demands placed on the systems depending on the number of call participants, fail to utilize pre-existing customer information to expedite the input of call contact information, and fail to provide a means to prevent various hardware devices including facsimile and answering machines from being bridged into a conference call.

SUMMARY

The invention pertains to an internet conference call bridge management (ICCBM) system and method with which a person having access to the Internet may efficiently input the contact number of at least one party with whom the customer wants to speak. The ICCBM system then calls the customer, calls the party or parties, and the audio signals are bridged in a manner that optimizes the call signal to noise ratio, minimizes demands placed on computing resources, and provides controls with which the customer may monitor and control the telephonic access of the other participants through the duration of the conference call.

The ICCBM system of the present invention is operably coupled to the Internet and to the public switch telephone network (PSTN). A customer with an internet appliance, such as a computer, a web-enabled PDA (Personal Digital Assistant) or web-enabled telephone or radio device, browser software and Internet access may then remotely retrieve from the ICCBM system first output means, namely an interface, for prompting the customer from the internet appliance to enter contact information associated with the audio communication device of at least one call-receiving party. The first output means, generally includes one or more web pages providing the customer interface for entering the contact information, as well as other call parameters as inputs. The contact information includes, at a minimum, a contact number or a link to a contact number for each party to participate in the call. The contact number is generally the telephone number of the audio communication device owned or in the possession of the party, although the contact number may be an IP (Internet Protocol) address corresponding to an internet appliance to which audio data is transmitted and converted to an audio signal.

The contact information entered by the customer is uploaded to the ICCBM system by first input means. Once uploaded, the call enabling means places a first telephone call to the audio communication device associated with customer, and subsequent telephone calls to the audio communication device of the one or more call-receiving parties. The calls placed by the system to the customer and to the call-receiving parties are then brought together by bridging means. In general, the first input means, call enabling means, and bridging means refers to the hardware and software of the ICCBM system used to control the execution of direct dial telephone calls, the bridging of these calls, as well as various regulatory functions including the maintenance of customer accounts and billing. The ICCBM system preferably and substantially resides on one or more servers that are operatively linked to the Internet, the PSTN, and one or more databases.

In some embodiments of the invention, the bridging means includes two call bridging subsystems identified as first and second bridging means. The first bridging means, which operates where the total number of call participants is two, preferably redirects the audio signals originating from audio communication devices of the customer and call-recipient by re-routing the incoming signals to the other participant's device. Preferably, the first bridging means does no or insubstantial amount of processing of the audio signals themselves. The second bridging means, which operates on conference calls involving three or more participants, preferably decodes the analog or digital audio signals, provides the appropriate mixing, and then re-encodes the signals for transmission to the call participants. The ICCBM system of the present invention is scalable and can therefore support conference calls between any number of participants, while minimizing the expenditure of system resources and maximizing the signal to noise ratio where there are only two call participants.

In some embodiments of the invention, the ICCBM system includes group-click means, which allows a customer to simultaneously initiate a call to a group of participants the customer would like to bring into simultaneous telephonic communication. In other embodiments the customer can consecutively select one or more parties to be added to the conference call. The group-click means is implemented in the form of hyper-link, such as hypertext transfer protocol (HTTP) and equivalents, and is accessible to the customer via the internet appliance. The contact numbers from which the customer may select the additional participants are preferably included in a pre-existing database defined by the customer and maintained by the ICCBM system. These contact names and numbers are preferably organized into a logical classification referred to as a contact group. The HTTP link, once associated with the contact group, permits the customer to simultaneously select and input all the contact numbers of a group, thereby avoiding the need to individually enter or individually select the contact numbers of the parties.

In some embodiments of the invention, the ICCBM system further includes call moderating means. In the preferred embodiment, the call moderating means is an interface through which the customer monitors the status of calls. Preferably, the interface indicates when a call is being dialed, connected, bridged, and disconnected. In some embodiments, the call moderating means further includes controls for permitting the customer to mute one or more parties, place one or more parties on hold, terminate the call to one or more parties, and record a call.

In some embodiments of the invention, the ICCBM system includes a means for allowing two customers to contact one another while maintaining anonymity of at least one, preferably two, of the customers.

In some embodiments of the invention, the ICCBM system further includes a means for monitoring the usage of the customer and his remaining balance and alerting the customer through a visual or audio notification.

DETAILED DESCRIPTION

Figure 1:
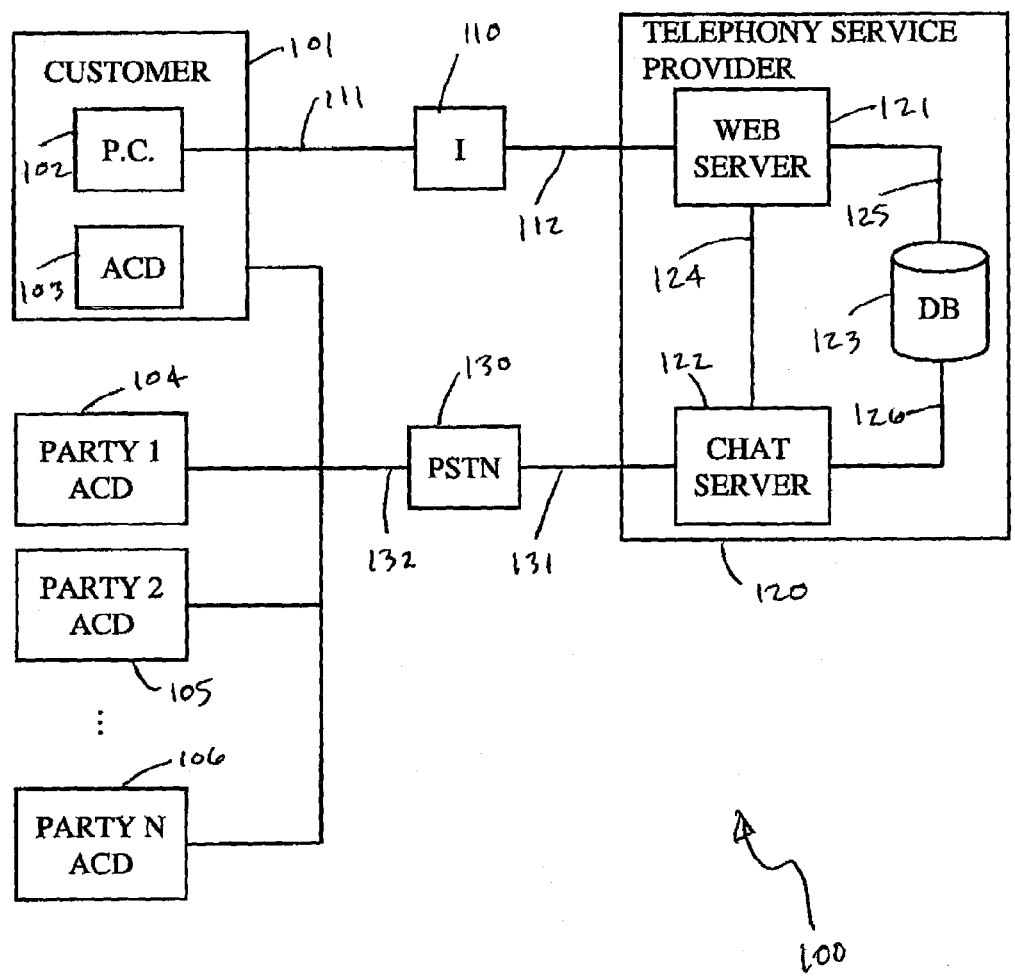
FIG. 1 is a block diagram illustrating the ICCBM system of a preferred embodiment of the present invention, various communication interfaces, and transport media.

Shown in FIG. 1 is a block diagram illustrating the ICCBM system of a preferred embodiment of the present invention, various communication devices, file servers, and transport media. The ICCBM system as described herein place a telephone call back to the customer and one or more direct calls to call-recipients in response to a request by the customer of the ICCBM system. The purpose of the call back to the customer and one or more calls to the additional parties is to bridge the plurality of calls and place the participants in audio communication. The term "customer" herein is synonymous with a client or "user" of the ICCBM system. A customer together with one or more call recipients or call-receiving parties, i.e., called "parties," constitutes the "participants" of the telephone call.

The ICCBM system 100 of the preferred embodiment includes a telephony service provider (TSP) 120 that is operatively coupled to an internet appliance 102 through which the customer 101 accesses the World Wide Web or Internet 110 more generally. The appliance 102 may be a personal computer, as illustrated, or other device including the hardware and software necessary to provide and interface with and exchange information between the ICCBM system 100. This software may include, for example, a web browser such as Internet Explorer®, Netscape™, or other packages known to those skilled in the art that permit a customer to execute download, view, input, output, upload, or otherwise interactively exchange information through web pages, hyperlinks, dialog boxes, and email exchange, for example. An alternative internet appliance 102 may be a web enabled phone or a personal digital assistant, for example. The appliance 102 is operably coupled to TSP 120 the by means of the underlying transport medium 111 and transport medium 112 which may include a Digital Subscriber Line (DSL), cable network, fiber optic network, intranet, ATM (asynchronous transfer mode) network, wireless LAN (Local Area Network), WAN (Wide Area Network) or Gateway, for example, with suitable modification. The transport medium 111 may also include a PSTN (public switch telephone network) and an Internet Service Provider (ISP), the telephone line being used by both the internet appliance and an Audio Communication Device (ACD), such as a telephone.

The customer 101 may further possess an audio communication device 103 for receiving the telephone call back from the ICCBM system. The other parties to the ICCBM system include one or parties equipped with their own audio communication devices including, for example, ACD 104, ACD 105 through ACD 106. These audio communication device may be telephones, cordless phones, cell phones, mobile terminals or other communication devices either directly or indirectly coupled to the publicly switched telephone network (PSTN) 130. The customer's internet appliance 102 and audio communication device 103 may be distinct device or a single integrated device.

A voice-over-internet-protocol (VOIP) Gateway (not shown) may also be present in the network between the customer 101 and TSP 120. A Voice Over Internet Protocol (VOIP) Gateway encodes_signals (thereby generating digital signals) originating from a Customer's telephone, and decodes IP data packets transmitted through the communication transport medium to the customer. The Gateway encodes data in accordance with ITU standard codes like G711U or G729A. which are then sent over the IP network. In particular, the signals generated by and transmitted to a telephone are conveyed by transport medium collectively referred to as the Public Switched Telephone Network (PSTN). One skilled in the art will recognize the need for various other types of gateways including voice-over-DSL, voice-over-Cable, and voice-over ATM gateways with various other forms of underlying network systems.

The standard cell phone also communicates indirectly with the Internet through the Gateway. The signals generated by and received at cell phones are supported by a Mobile Switching Center (MSC), not shown, which converts between the PSTN and various wireless communication formats such as TDMA (Time division Multiple Access), CDMA (Code division Multiple Access), and GSM (Global System for Mobile), for example.

In accordance with the preferred embodiment of the present invention, the customer 101 may initiate a call to one or more parties by inputting the contact information, i.e, the telephone number or other address associated with the parties' ACD. The contact information is used by the ICCBM system to call and link two or more parties in the manner prescribed by the customer. The ICCBM system 100 in the preferred embodiment includes the hardware and software associated with the telephony service provider (TSP) 120. The TSP 120 preferably includes one or more web servers 121 that support the Internet protocols necessary to request and receive the information necessary to initiate and execute the ICCBM procedure. The web server 121 preferably has access to database 123 on which information of registered customers is stored, the information including account numbers, passwords or pin numbers, billing information including credit card numbers and addresses, pre-recorded audio and multimedia files, call recipient profile and contact information including the names and contact numbers, as described in more detail below.

The TSP 120 preferably includes one or more chat servers operably coupled to the web server 121 and database 123 by means of communication links 124 and 126, respectively. The chat servers are preferably dedicated systems capable of dialing telephone calls to the contact numbers of the participants and subsequently bridging or mixing the appropriate signals to effectively bring the customer and one or more call recipients into audio communication. The calls placed by the chat server 122 are in this embodiment indirectly communicated to the customer ACD 103 and parties ACD 104 through 106 by means of the PSTN 130.

Figure 2:
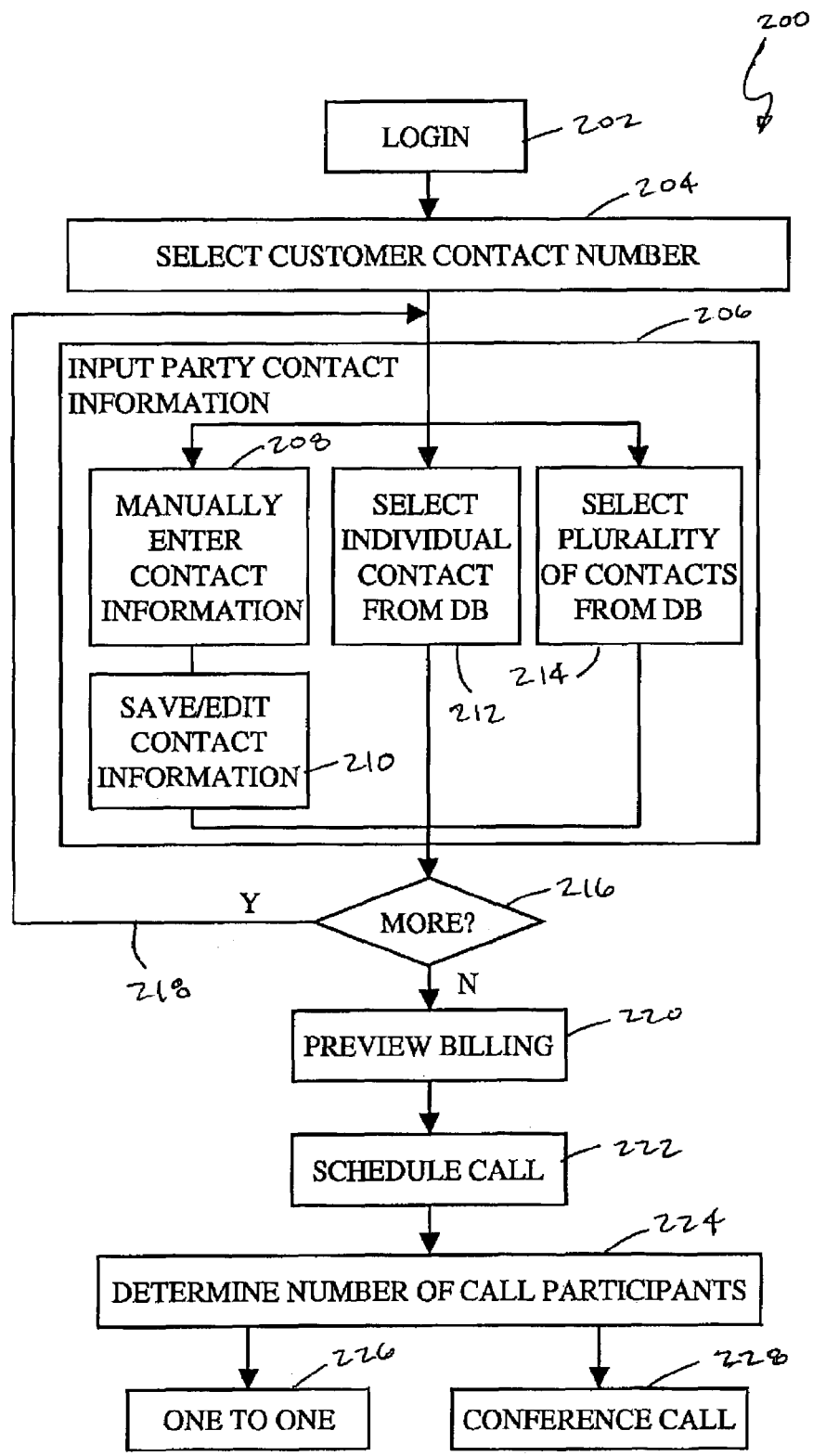
FIG. 2 is a flowchart of the method of generating a call from the system according to the preferred embodiment of the present invention.

Illustrated in FIG. 2 is a flowchart of the method of generating a ICCBM according to the preferred embodiment of the present invention. The method 200 of initiating a call according to the preferred embodiment begins with the authentication procedure indicated by login step 202 in which the customer directs his browser software to access the web server 121 and download the first output means. The output means preferably comprised of one or more web page that collectively prompt the customer 101 for the information necessary to execute the ICCBM procedure. To authenticate the customer 101, account information sufficient to uniquely identify the customer 101, including an account name or number, password or pin number, for example, is uploaded to the TSP 120. In the alternative, the TSP 120 may install a "cookie" on the customer internet appliance 102, usefully for recognizing returning customers without the manual entry of account information. The account information is then compared by the TSP 120 to existing account information stored in database 123 prior to providing the customer 101 access to subsequent features of the ICCBM system of the present embodiment.

Figure 7:
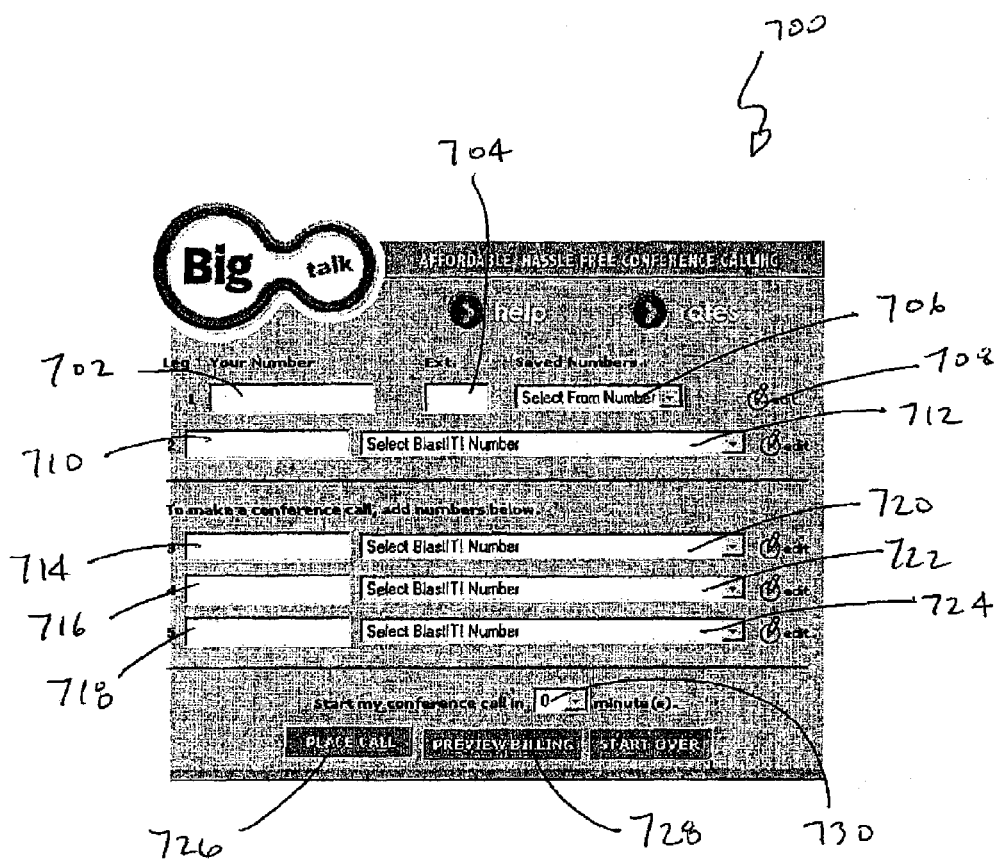
FIG. 7 is an exemplary graphical user interface for prompting the customer to input the contact numbers of the customer contact number and the contact information for one or more additional participants to the call.
Figure 9:
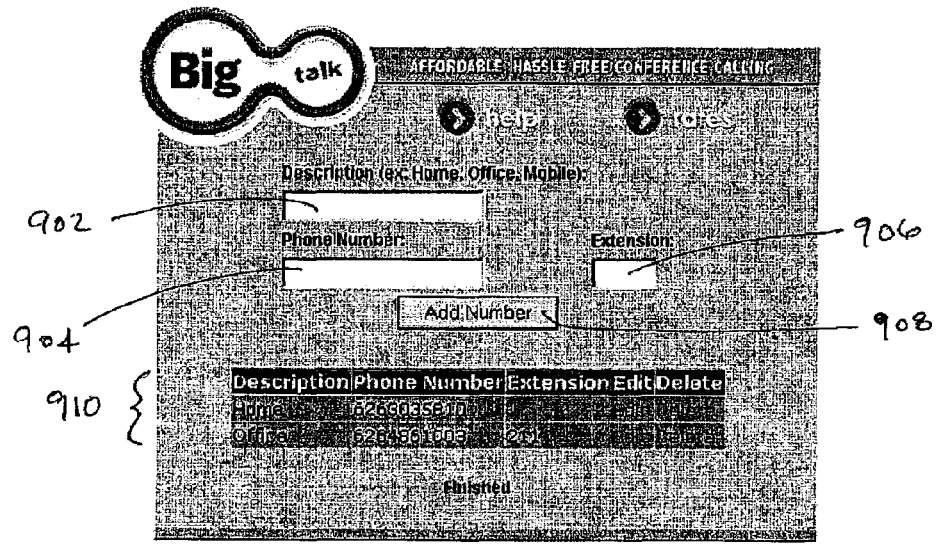
FIG. 9 is an exemplary graphical user interface for inputting or editing a customer's contact information.

After a successful login 202, the customer 101 is prompted, by means of a first output means of the ICCBM system 100, to input the contact information for himself and one or more parties the customer intends to bring into and participate in the call. A representative web page 700 for inputting the requisite information is illustrated in FIG. 7. The graphical user interface provided by web page 700 prompts the customer 101 to input his own contact number and extension, which are entered in fields 702 and 704, respectively, in accordance with the step 204 of FIG. 2. If not previously recorded, the customer may select the editing tool available by hyperlink 708 with which he may cause the newly entered contact number to be saved to his account on database 123. As illustrated in FIG. 9, the interface 900 provides the customer 101 the means to associate the new contact number provided in fields 904 and 906 with an identifier or term description in field 902, and the new contact information added to existing contact information 910. If, however, the customer's contact was previously recorded, the customer may select his preferred contact number from a list of one or more contact numbers using the pull-down menu 706.

In some embodiments, the contact number used by a returning customer is recognized by the TSP 120 and automatically provided in the appropriate field without the need to be manually entered. Caller-id may be used in some embodiments to detect the incoming phone number for a customer using a web-enabled telephone or a dial-up ISP to access the output means. In addition, the contact number for a returning customer may be used to authenticate the customer, or by the TSP 120 to automatically retrieve the customer's pin number without the need for manually entry. Preferably, the first output means includes means for requesting and recalling a contact number from the pre-existing contact list associated with the customer's account. In some embodiments, a request may be made by entry or selection of a unique pair of single digit numbers that are associated with the contact number of individual persons and entities. The pre-existing contact list is preferably defined by the customer and stored at the database 123. The apparatus and method for implementing such a database is taught in copending U.S. patent application Ser. No. 10/039,795, entitled "Family tree website architecture," which is hereby incorporated by reference herein. The ICCBM system of the present invention preferably cooperates with the system set forth and claimed in the '795 patent cooperates with the TSP 120 of the present invention to provide the customer 101 access to a pre-existing database comprised of contact names logically organized according to contact groups, each contact group comprised of one or more contact names. Two common contact groups are "family" and "business." Each contact group is designated by a first number, preferably a single digit, used to uniquely identify each group within the customer's list of contacts. Each of these groups is in turn comprised of one or more contact names designated by a second number, preferably a single digit, used to uniquely identify each person or entity with respect to the other contact names associated with that group. Each contact name has associated with a contact number, e.g. a telephone number, at which the contact may be reached. One skilled in art will recognize that the present invention is not limited to a pair of single digits, and may be implement using a plurality of alphanumeric characters sufficient to uniquely identify each contact.

The first and second numbers together are sufficient to uniquely identify each contact number of each contact within the customer's account. The first and second number, when linked to the contact number, permit a customer 101 to enter two single digit numbers to summon the contact number from the database 123 without the need to remember or manually enter the desired contact number. A customer 101 of the present invention may avail himself of the contact information by selecting or otherwise entering the pair of numbers from the either the field 714 or pull-down menu 720, for example. Selection of the pair of single digit numbers from menu 720, will preferably cause the complete contact number associated with the number pair to be displayed in the field 714 where it may be confirmed by the customer. If selected, it is this contact number that will be dialed by the ICCBM system.

In some embodiments, the TSP 120 includes automatic contact detection means for detecting the contact number used by the customer 101 to make the present call into the TSP. The detection means in the preferred embodiment is based on the caller-id services currently supported in the telecommunications industry. Upon detection, the number automatically detected preferably appears as the default number in field 702, and authorized by the customer for purposes of initiating a call back to the customer.

In additional to his own contact information, the customer 101 must input the contact information corresponding to one or more parties with whom he intends to make audio contact. As illustrated by step 206 of FIG. 2, the customer 101 preferably has at least three options for inputting party contact information. These options include manually entry 208, individual selection 212 from the pre-existing database, and group selection 214 from the pre-existing database.

In accordance with step 208, the customer 101 may manually enter the contact number corresponding to the audio communication device of one or more parties, i.e., 104 through 106. Additional parties to a conference call may be included by entry of the contact numbers in dialog boxes, 716 and 718, for example. If not previously recorded, the customer 101 may select the editing tool available by hyperlink 720, for example, to save the newly entered contact number to the database 123 and associate the number with a new or pre-existing contact. In some embodiments, contact information of the customer and/or call recipients is inputted into the ICCBM system 100 using voice recognition means. Voice recognition means may be implemented on the customer's internet appliance 102, or supported by the output means using VXML (Voice Markup Language) in a manner known to those skilled in the art.

If the contact number of an intended call recipient was previously recorded, the customer 101 may select the contact number from a list of one or more contact numbers using the pull-down menu 720. The pull-down menu is generated in response to a query of the database 123 for contacts and or contact numbers previously entered by the customer 101. This step is illustrated as step 212 in FIG. 2. Additional parties can be included in a conference call by entry of the audio communication device contact number in dialog boxes, 716 and 718, for example.

As a third option, the customer 101 may use group-click means to simultaneously select a plurality of contact numbers through what is referred to as a "one click" contact selection process illustrated as step 214 of FIG. 2. In accordance with the step, the customer 101 may click a single hyperlink (not shown) associated with a contact group, thus causing each of the contact numbers of the individuals that compose the group to be retrieved from the database 123. In this manner, a customer 101 may simultaneously select all of the members of his "family" group or his "business" group, for example, with a single click.

The various steps of entering or otherwise selecting the contact numbers as described above are repeated by means of decision block 216 and return path 218 until the contact numbers for each of the parties intended to participate in the subsequent call are provided therein. At this point, the list of contact numbers is complete and the customer 101 may initiate the call back by activating the "place call" hyperlink 726.

Figure 8:
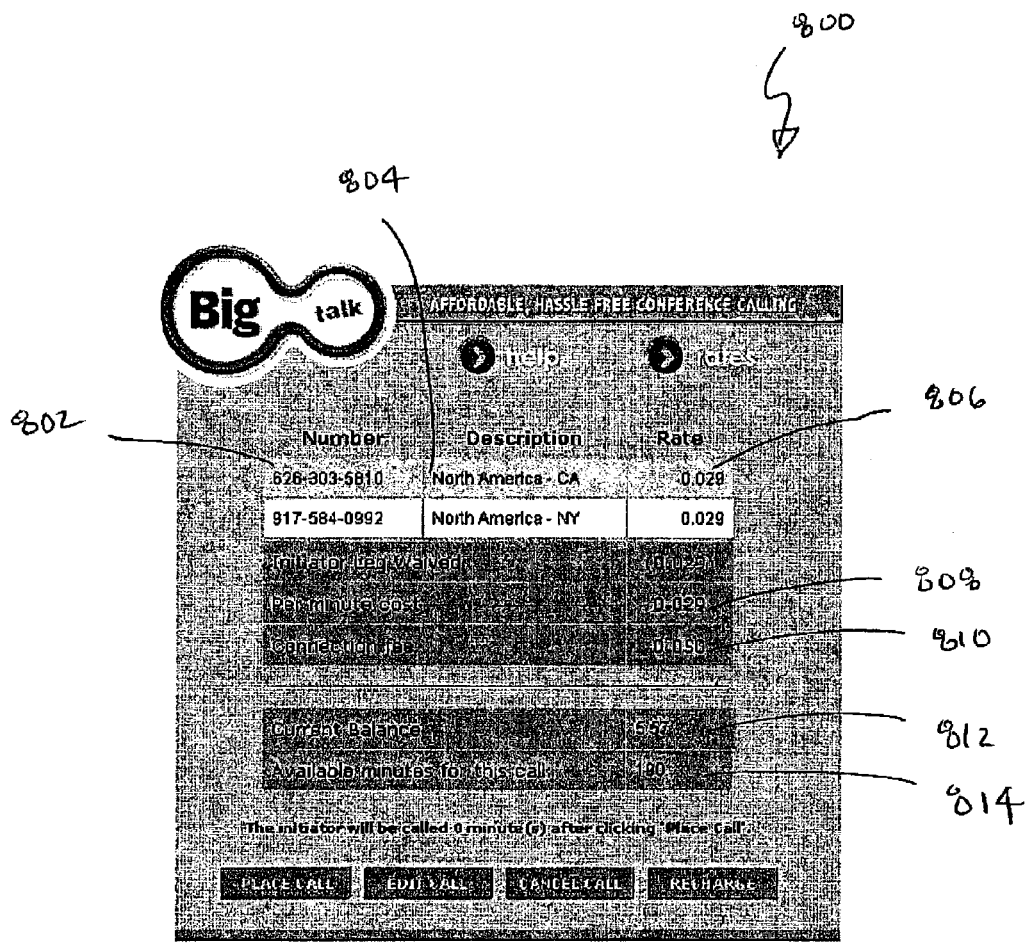
FIG. 8 is an exemplary graphical user interface for presenting the customer with the anticipated charges based upon contact information provided.

In accordance with the preferred embodiment, the customer 101 is presented the option of previewing the call billing or scheduling the date and time of the call back prior to placing the call back. A request by the customer 101 to view the billing, as indicated in step 220, retrieves a web page consist with that illustrated in FIG. 8. The web page 800 illustrates an exemplary interface for presenting the customer 101 with the anticipated charges, which are calculated as a function of the contact information provided. As illustrated, the customer 101 is preferably presented with the one or more contact numbers 802 to which the customer intends to call, the geographic region 804 corresponding to the area code of the contact number to the immediate left, the cost per minute 806 of the call, the total cost per minute 808 to maintain the call, which is the sum of each the rates of each of the underling calls, and a connection fee 810 if applicable.

According to the preferred embodiment, the output means exemplified by FIG. 7 further includes the step of scheduling the call time or delay, as illustrated by step 222 of FIG. 2. The schedule time step 222 allows the customer to determine in advance exactly when the call back is to be executed. In the preferred embodiment, the customer 101 may enter the number of minutes 730 that the actual telephone call to the participants are placed after the "place call" hyperlink 726 is activated. A delay may be necessary for example where the customer's internet appliance 102 and audio communication device 103 use a common telephone line to access both the Internet 110 and PSTN 130, respectively. As such, the customer 101 may require at least a moment to disengage the internet appliance and re-establish the ACD connection, either physically or by means of software. The default delay time 730 is zero.

Besides a call delay, a customer may be presented with a calendar to schedule a call at the convenient for customer. The various inputs for scheduling the call may include the time, date, day of the week and time zone, whether the call is recurring, i.e. occurring every Monday at 8:00 AM PST, for example.

One skilled in the art will recognize that the steps of selecting the customer contact number 204, selecting the party contact number(s) 206, previewing the billing 220, and scheduling the call delay 222 are independent events that may be executed in any relative order and by means of one or separate web pages without departing from the spirit or scope of the claimed invention.

Upon activation of the "place call" hyperlink 726, the ICCBM system will determine the number of call participants 224 and execute either a "one-to-one" call back 226 or a "conference call" call back 228. If the customer 101 has provided a single contact number in step 206 above, the ICCBM system 100 executes two separate calls which are subsequently bridged to bring the customer and call-receiving party in telephonic contact. After being bridged, the telephonic link is indistinguishable from a standard call placed to the by customer 101 directly to a party 104. If, however, the total number of call participants is three or more, the ICCBM system 100 executes a conference call by means of a process including steps different than used for one-to-one calling.

In some embodiments, the output means further includes a means for the customer 101 to select an audio file present on the TSP 120 where it may be played or other wise transmitted to one or more participants of a telephone call made in accordance with the preferred embodiment of the present invention. An audio file for purposes of the preferred embodiment is a music file, vocal file, personal audio message or greeting, pre-existing audio library file available for selection from the TSP 120. The audio file is preferably a pre-existing file that is uploaded to the TSP 120, although it may also be created as a recording made with the assistance of the TSP 120. In either case, the audio file is preferably stored in database 123 or a similar file server were it is linked to the customer's account information and made available to the customer 101. The user 101 may then cause the audio file to be played to at least one other person joined in the telephone call by the TSP 120. See also copending patent application Ser. No. 10/198,008, entitled "Computerized Greeting System and Method," which is hereby incorporated by reference.

Figure 3:
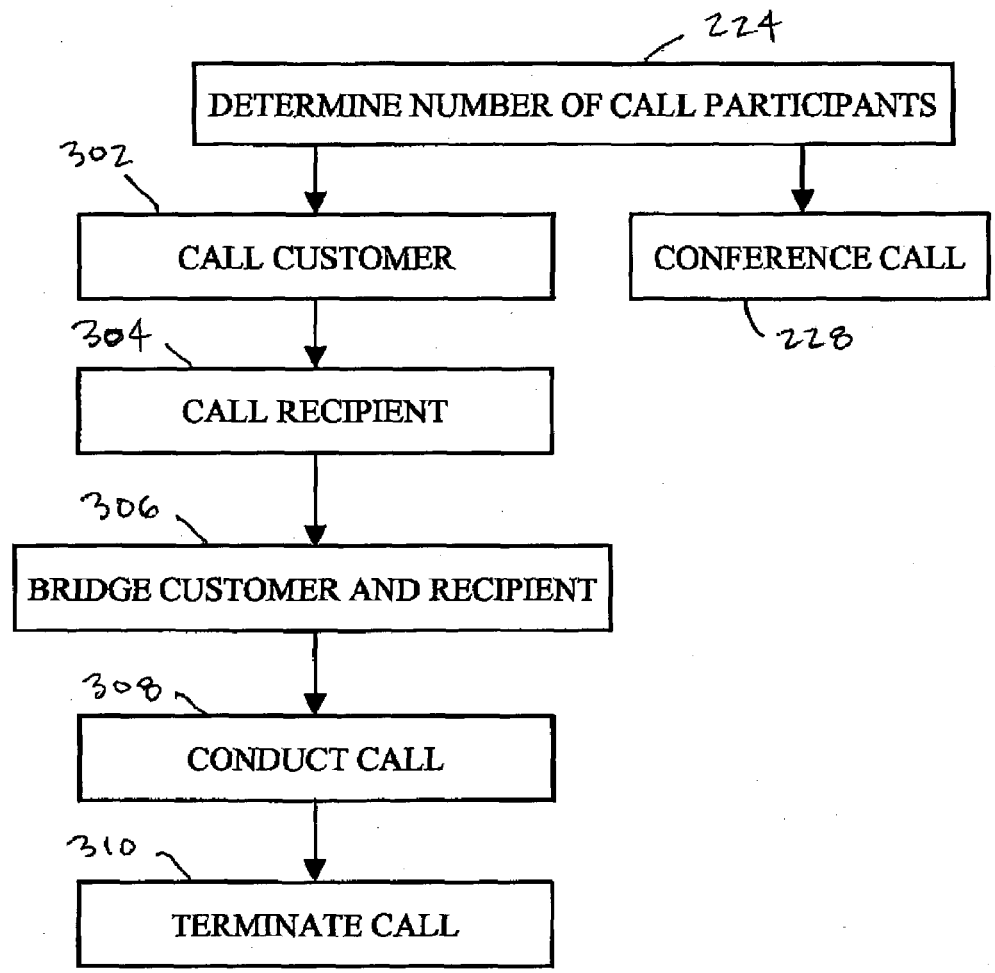
FIG. 3 is a flow chart illustrating the method of executing a one-to-one telephone call using the ICCBM system of a preferred embodiment of the present invention.

Illustrated in FIG. 3 is a flow chart of the method of executing a one-to-one telephone call using the ICCBM system of a preferred embodiment of the present invention. After detecting 224 that there are only two participants to a call, the ICCBM system 100 waits the requisite schedule time 730 prior to placing a call back 302 to the customer 101 at the contact number specified in step 204 of the customer's ACD 103. After the TSP 120 detects that the customer 101 has answered the call, the system 100 dials the call recipient in step 304 at the contact number 206 corresponding to the party's ACD 104. The calls are immediately bridged 306, thereby allowing the customer 101 to hear the party's ACD 104 ring and the call recipient answer.

The call between the customer and the call recipient then proceeds 308 in a manner consistent with a direct call from customer 101 to party 104 until the call is terminated 310 by either participant. Unlike a direct call, however, the ICCBM system provides a number of specific advantages to consumers and TSPs that were previously unavailable. First, the ICCBM system allows a customer to initiate a call through the relatively low cost TSP without the customer incurring the higher costs associated with telecommunications conglomerates that dominate the PSTN, and without the TSP 120 incurring the expense of providing a toll-free 800 number(s) for customer usage. Second, the ICCBM system provides global access to customers, irregardless of whether they have access to toll-free numbers and local access numbers, which is the current norm for ICCBM systems. Third, a customer using the ICCBM system can avoid surcharges when the customer is calling from a phone booth, for example.

Figure 5:
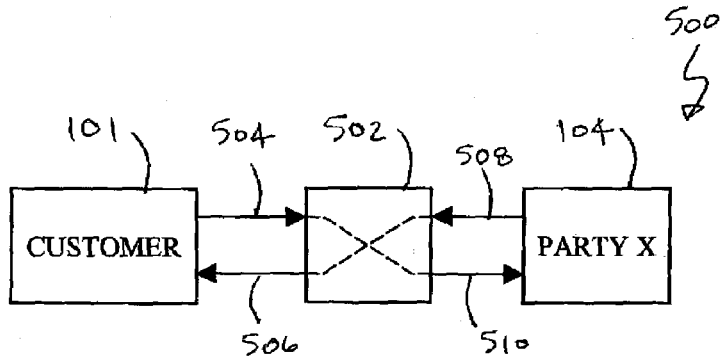
FIG. 5 is a block diagram illustrating bridging network underlying a one-to-one telephone call using the ICCBM system of a preferred embodiment of the present invention.

Referring to FIG. 5, a block diagram of the bridging network underlying a one-to-one telephone call using the ICCBM system of a preferred embodiment of the present invention is illustrated. The ICCBM system 100 implements a first bridging means 502, preferably with software resident on the chat server 122, to place the customer 101 and call recipient 104 in audio communication. As illustrated, the audio signal 504 originating with the customer 101 is operatively coupled by means of channel 510 to the receiver of the party ACD 104. Similarly, the audio signal 508 originating with the party 104 is coupled by means of channel 506 to the customer ACD 103 receiver. Whether the audio signals are analog signals or digital packets of sound data, the information is routed through the bridge 502 of the chat server 122 with little if any processing or demand for computational resources. The signal quality afforded by first bridging means is relatively high quality compared to the conference calling system described in detail below.

Figure 4:
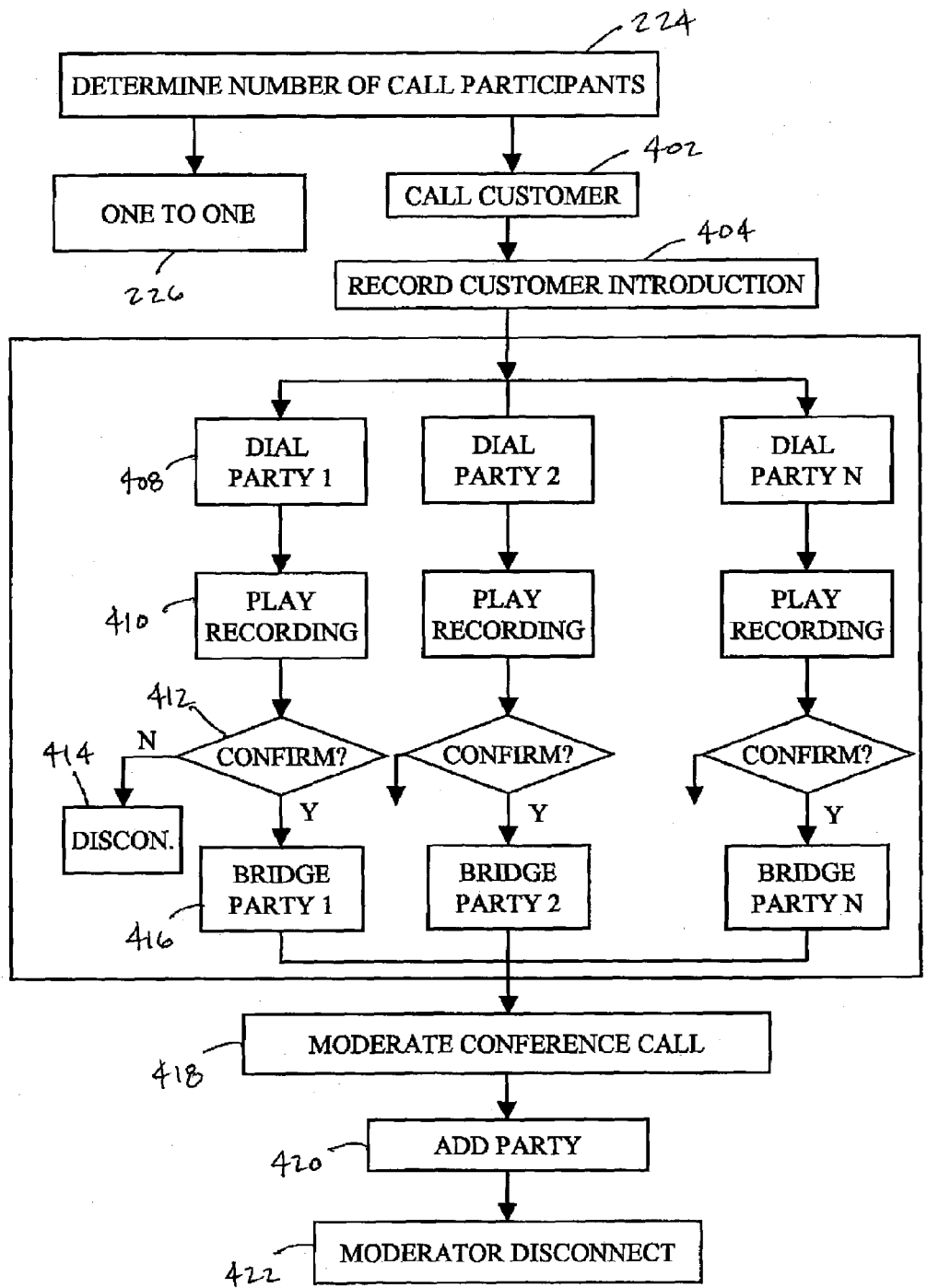
FIG. 4 is a flow chart illustrating the method of executing a conference call using the ICCBM system of a preferred embodiment of the present invention.

Illustrated in FIG. 4 is a flow chart depicting the method of executing a conference call using the ICCBM system of a preferred embodiment of the present invention. In this embodiment, an initial call 402 is placed by the chat server 122 to the customer 101 at ACD 103, at which point the customer 101 is prompted to record an introduction including the customer's name, for example. The additional two or more participants, represented by 406, are then called.

The ICCBM system 100 preferably elicits an interactive prompt in which the call recipient is requested to respond by entering a number at the ACD keypad, for example. The recipient input is required to alleviate problems associated with calls that are accidentally placed to or picked-up by facsimile machines, answering machines, or PSTN system problems like dead air etc.

After the appropriate response is received from the call-recipient, the pre-recorded introductory message made by the customer in step 404 is played to the call-recipient. The purpose of the introductory message is to provide a vehicle for the customer to invite the called party to accept the call, which might otherwise be confused with a telemarketing call. The call recipient may then agree in step 412 to participate in the conference call, thereby causing the calls to the customer 101 and party 104 to be bridged by TSP 120. If the conference call is declined, the call is terminated 414 prior to being bridged 416 any conference call currently in progress. The steps of calling 408, playing the recording 410, confirming 412, and bridging 416 are simultaneously repeated for each of the call recipients until each party is either brought into the conference call or disconnected.

Figure 10:
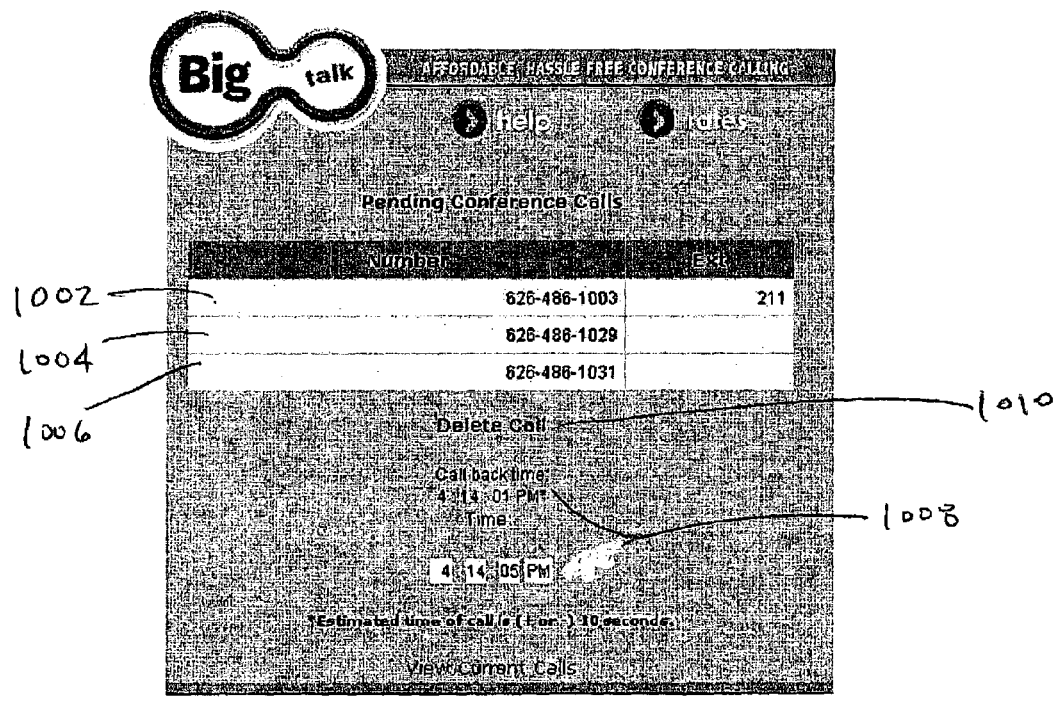
FIG. 10 is an exemplary graphical user interface for displaying the status of one or more pending calls prior initiation of a conference call.

In some embodiments, prior to the actual calls being placed to the customer 101 and the call recipients, the customer may actively monitor the status of each pending call by means of an exemplary web page as illustrated in FIG. 10. As illustrated, the customer may note various contact numbers, and optionally delete 1010 these numbers prior to the calls being dialed. The remaining time prior to the execution of the conference call is depicted by outstanding schedule time 1008.

Figure 11:
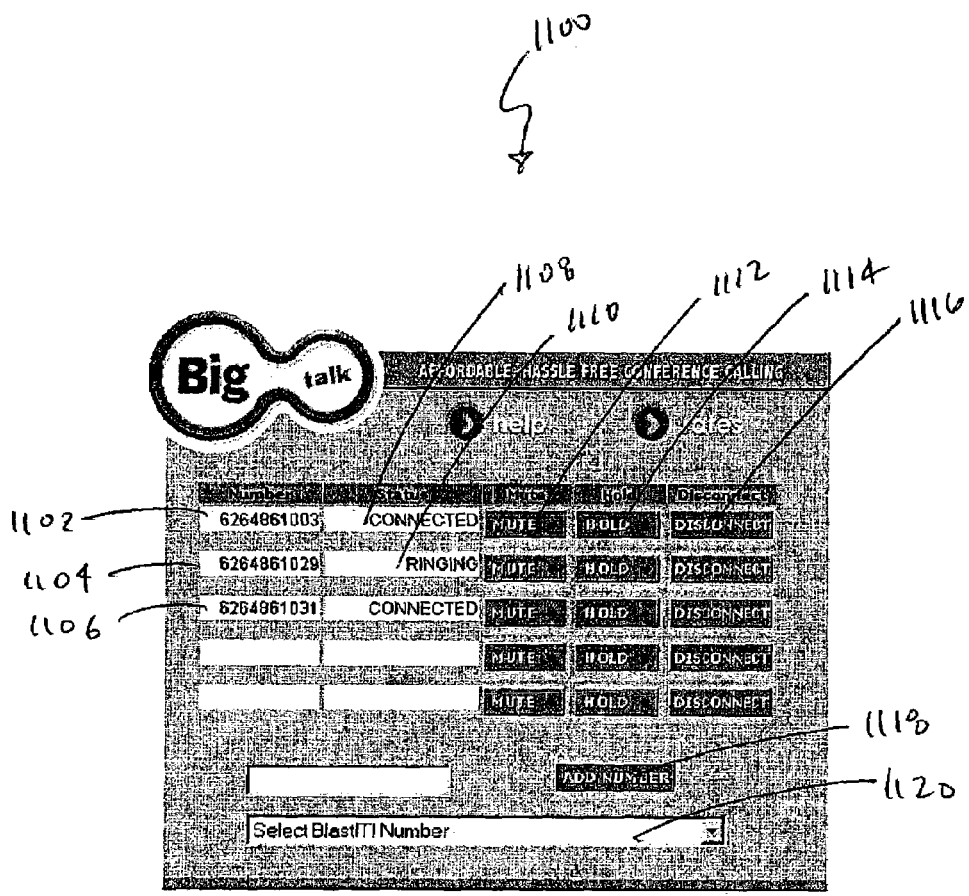
FIG. 11 is an exemplary graphical user interface for displaying the status of one or more pending calls concurrent with an ongoing a conference call.

After the schedule time 1008 has expired, a first call is placed to the customer 101, and subsequent calls then simultaneously placed with each of the call recipients. Concurrent with the dialing of the call recipients, the customer 101 has the option of monitoring the status of the conference by means of the exemplary graphical user interface illustrated in FIG. 11. A call controlling means including the user interface illustrated permits the customer to moderate the access and participation of each call recipient. For example, the customer can watch in real-time as each party is dialed 1110 and then connected 1108. The customer interface 1100 may optionally include various call control tools including call muting 1112, call hold 1114, and call disconnect 1116. These functions may be applied by the customer to each call recipient individually.

During the conference call, the customer 101 has an option of adding additional participants 1118 into the conference by entry or selection of a contact number from the pre-existing contact numbers in the database 1120. The additional call-recipient would then be dialed, connected, and bridged into the on-going conference call in the same manner described above.

In some embodiments of the invention, call services of the TSP 120 are applied against a credit card, or are prepaid and the calls charged against an existing account balance. In the case of a prepaid account, the ICCBM system preferably estimates the cost of the conference, including the rate of the participants and the destination charges incurred, while the conference call is in progress. The estimated cost is compared against the remaining account balance of the customer. If a predetermined monetary threshold is triggered, the ICCBM system preferably alerts the customer 101 by transmitting a notice to the customer indicating the remaining call time available. The notification of the remaining account balance is communicated to the customer in audible form through the file switch 652, or graphically via the customer interface 1100.

Figure 6:
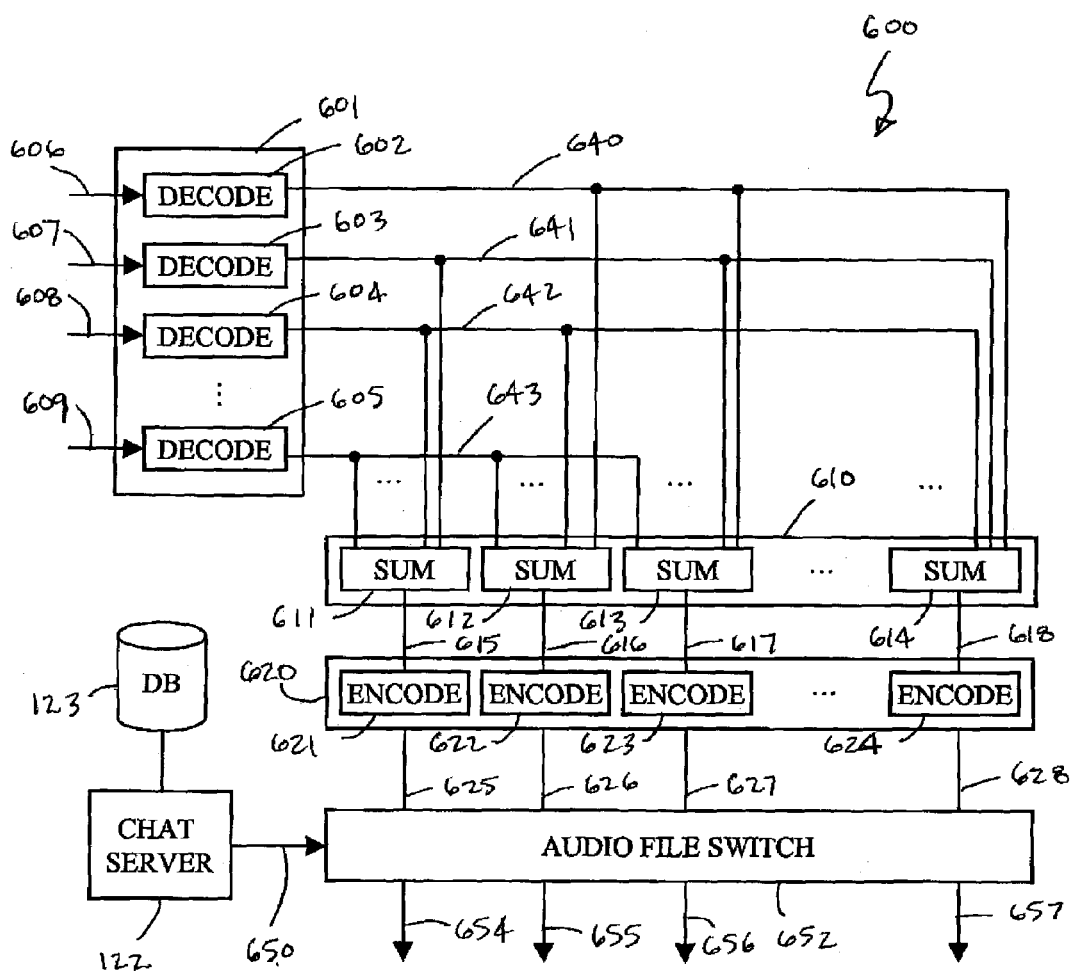
FIG. 6 is a block diagram illustrating bridging network underlying a conference call using the ICCBM system of a preferred embodiment of the present invention.

Referring to FIG. 6, a block diagram illustrating the bridging network underlying a conference call in the preferred embodiment is shown. The second bridging means 600 is primarily adapted to bridge the audio signals of three or more parties, which collectively constitute a conference call. Although the second bridging means 600 may be used to bridge calls between only two individuals, such an implementation comes at the cost of reduced signal to noise and increased demand on system resources. These resources may include software resources and or hardware control and switching, for example, both of which are utilized more efficiently according to the teachings of the present invention.

One skilled in the art would recognize that this ICCBM system takes advantages of the technological advances that have led to proliferation of IP devices including the wireless 3G or 4G technologies that support IP as call control signaling standard by alleviating the "tandeming" (encoding, decoding at various points in the network) phenomenon associated with switching based systems resulting in significant quality and cost savings. Two audio communication devices, either mobile terminal or IP phone, may transmit digital packets directly to the ICCBM system which could then redirect the packets to the remote party for a one-to-one call.

The input to the second bridging means 600 includes three or more input audio signals 606–609, the audio signals being either analog signals or digital data in the form of packets depending on the preference of the TSP 120. These audio signals 606–609 correspond to output signals originating from the customer ACD 103 and party ACD's 104 through 106, illustrated in FIG. 1. In general, the second bridging means 600 decodes the input audio signals 606–609, combines the signals such that each conference call participate receives the mixed audio signals of the other participants, and then encodes the mixed audio signals which are transmitted back to the appropriate ACM.

The decoding means 601 decodes each of the input audio signals 606–609 by means of decoding operators 602–605, respectively. The implementation of the decoding operators 602–609 will depend on format of the audio signal 606–609 (e.g. like PCM or ADPCM etc). The decoder, summer and encoder can also be implemented on a specialized hardware board comprising of DSP (digital signal processors) which would alleviate the system resources of a host based computer system including but not limited to Windows or UNIX operating systems.

The decoded input audio signals 640–643 are switched or otherwise directed to mixing means 610, which is comprised of sum operators 611–614. Each of the sum operators 611–614 mixes two or more decoded input audio signals to create unencoded output audio signals 615–618. The decoded input audio signals 640–643 are mixed such that each of the N participants of the conference call hears only the voices of the remaining N−1 participants. The unencoded output audio signals 615–618 are then conveyed to the encoding operators 621–624, respectively, of the encoding means 620 where the signals are again encoded according to the convention implement. The encoded output audio signals 625–628 are then directed by means of the PSTN 130, Internet 110, or other equivalent means back to the appropriate ACD.

In some embodiments, the second bridging means 600 further includes and audio file switch 652 used to "play" a pre-existing audio file, introduced above, to the call participants. The pre-existing audio file is provided to audio file switching means 652 as audio file input 650. In response to the customer selection made available by the output means, an audio file is retrieved from the database 123, streamed from the chat server 122, and provided to the call participants my means of audio file switching means 652. After the audio file has finished playing, in the preferred embodiment, the audio file input 650 is deselected and the output signals 654–657 are switched back, i.e. revert to the encoded output audio signals 625–628.

In some embodiments, switching means 652 is used to audibly notify the customer 101 of the available call time based upon the balance of a prepaid account. Preferably, only the customer 101 may hear the notice.

Figure 12:
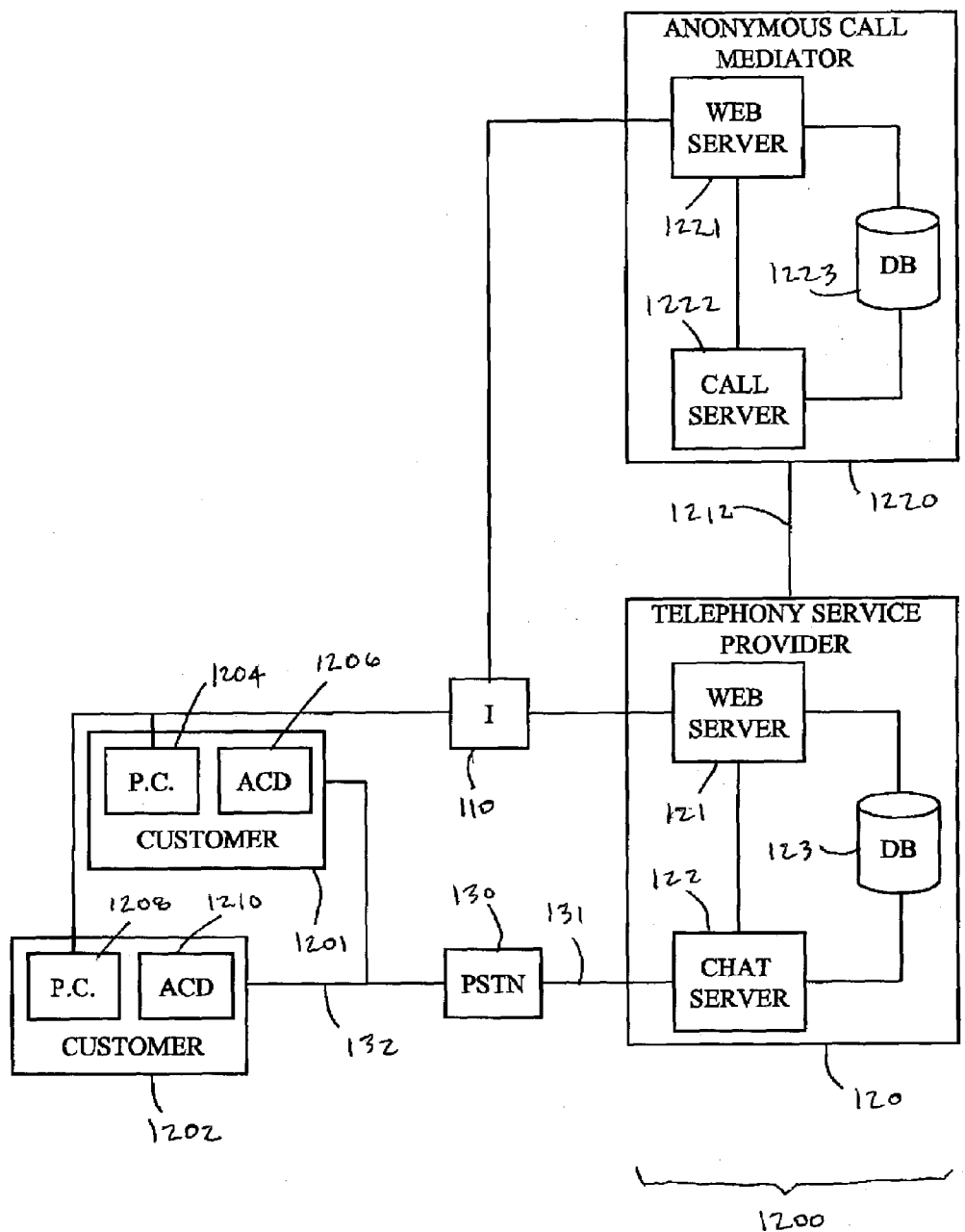
FIG. 12 is a block diagram illustrating the anonymous ICCBM system of a preferred embodiment of the present invention, various communication interfaces, and transport media.

Referring to FIG. 12, a block diagram of the anonymous ICCBM system of a preferred embodiment of the present invention, various communication interfaces, and transport media, is illustrated. An anonymous call as used herein refers to a call that is authorized by each of the participants to the call, but conducted in such manner so as to prevent the contact number of at least one participant from being learned by another participant. The anonymous ICCBM system 1200 may therefore be used to coordinate the calls between individuals who would like to engage one another in discussion without jeopardizing personal contact information. Potential applications of the system include, for example, call dating services where both participants may opt to keep their telephone number confidential until a greater degree of trust is established between the individuals; or an abuse hotline, for example, where the individual seeking counseling may effectively make themselves available to receive a call initiated by the counseling services while preserving one's anonymity.

The anonymous ICCBM system 1200 includes the TSP 120 with a web server 121, chat server 122, and database 123 as described above. The TSP 120 is in this embodiment operatively coupled to an anonymous call back mediator (ACBM) 1220 with which the TSP 120 coordinates anonymous calls between a first customer 1201 and a second customer 1202. The ACBM 1220 includes a web server 1221 operatively coupled to the Internet 110 as well as a call server 1222 and a database 1223. One skilled in the art will recognize that the TSP 120 and the ACBM 1220 may also be separate computer systems operatively coupled by means of a direct communication line 1212, or be integrated into a single system.

Figure 13:
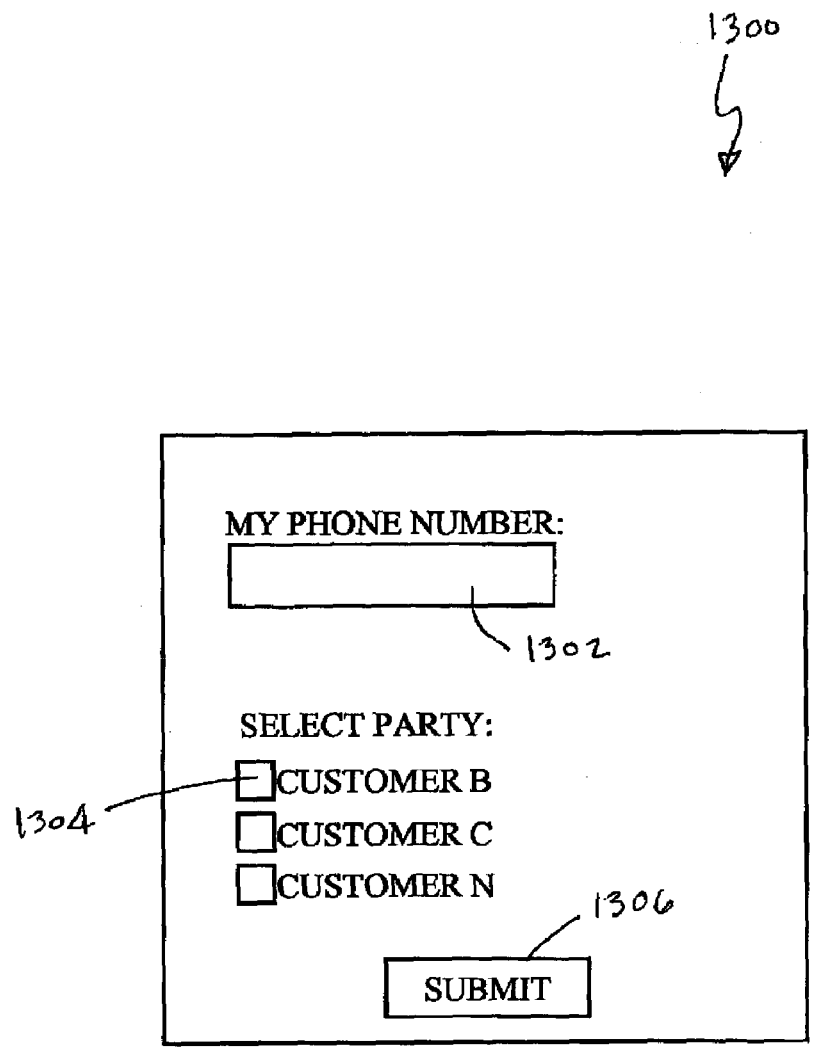
FIG. 13 is an exemplary graphical user interface with which a first anonymous customer of the anonymous ICCBM system of a preferred embodiment may initiate an anonymous call between the first anonymous customer and a second anonymous customer.

According to this embodiment, a first customer 1201 and second customers 1202 are equipped with an internet appliance 1204 and 1208 and an ACD 1206 and 1210, respectively. First and second customers 1201 and 1202 independently access the web server 1221 and optionally input at least one contact number at which each can be reached. Depending on the application, purpose, or business model, customers may also input various parameters or condition under which the customer would accept a call. For a dating service, for example, an individual may provide his or her likes and dislikes, which when matched to another customer may provide a potential dating opportunity. These parameters are then stored in an account maintained on the database 1223 where they are available to call server 1222. If and when the anonymous call back conditions of the two or more customers are satisfied, the call server 1222 may make a web page available to the prospective participants to coordinate a call. A web page, consistent with that illustrated in FIG. 13, may be used by first customer 1201 to input his contact number 1302 and authorize a call between the first customer and a second customer B 1304 selected from the available list. If authorized by both prospective participants, the call server 1222 conveys both contact numbers to the chat server 122. Upon receipt of the contact numbers, chat server 122 places calls to the first and seconds customers, which are thereafter bridged. In this manner, first and second customers are able to engage in a telephone call without either participant knowing the others telephone number.

Although the above description contains many specifics, these should not be construed as limiting the scope of the invention, but rather as merely providing illustrations of some of the presently preferred embodiments of this invention.

Therefore, the invention has been disclosed by way of example and not limitation, and reference should be made to the following claims to determine the scope of the present invention.

We claim:

1. An ICCBM system operably coupled by means of the Internet to an internet appliance of a customer, and to a public switch telephone network, the ICCBM system comprising:
   (a) first output means for prompting the customer from the internet appliance to enter contact information associated with an audio communication device of at least one call-receiving party;
   (b) first input means for receiving contact information of at least one call-receiving party from the customer's internet appliance;
   (c) call enabling means for placing a first telephone call to an audio communication device associated with customer, and a telephone call to each audio communication device of at least one call-receiving party;
   (d) bridging means for bridging the first telephone calls to the customer and at least one call-receiving party as a function of the total number of call participants, wherein the customer and one or more call-receiving parties are in audio communication; and
   (e) audio file switching means for transmitting an audio file to an audio communication device of one or more call-receiving parties.

2. The ICCBM system of claim 1, wherein the audio communication device associated with the customer is the internet appliance of a customer.

3. The ICCBM system of claim 1, wherein ICCBM system further includes:
   (a) first bridging means for bridging the first telephone call with a call to a single call-receiving party; and
   (b) second bridging means for bridging the first telephone call with a call to two or more call-receiving parties.

4. The ICCBM system of claim 3, wherein the first bridging means directs an encoded audio signal associated with the customer audio communication device to the audio communication device of the call-receiving party, and directs the encoded audio signal associated with the audio communication device of the call-receiving party to the customer audio communication device.

5. The ICCBM system of claim 4, wherein the second bridging means further includes decoding means for generating decoded audio signals, mixing means for combining appropriate decoded audio signals, and encoding means for encoding the signals generated by the mixing means.

6. The ICCBM system of claim 5, wherein the second bridging means further includes the audio file switching means for transmitting an audio file to the audio communication device of one or more call-receiving parties.

7. A ICCBM system operably coupled by means of the Internet to an internet appliance of a customer, and further coupled to a public switched telephone network, the ICCBM system comprising:
   (a) first output means for prompting the customer from the internet appliance to input a contact number for an audio communication device of at least one call-receiving party; said contact number being selected from a list of pre-existing contact numbers stored in an account associated with the customer;
   (b) first input means for receiving contact information of a least one call-receiving party from the customer's internet appliance;
   (c) call enabling means for placing a telephone call to an audio communication device of the customer and a telephone call to each audio communication device of one or more call-receiving parties;
   (d) bridging means for bridging the telephone call to the audio communication devices of the customer and one or more call-receiving party wherein the customer and one or more call-receiving parties are in audio communication; and
   (e) audio file switching means for transmitting an audio file to an audio communication device of one or more call-receiving parties.

8. The ICCBM system of claim 7, wherein the first output means for prompting the customer to schedule the time at which the call enabling means is to initiate the call to the customer.

9. The ICCBM system of claim 8, wherein the first output means for prompting the customer to schedule the time to call includes a field for entry of a time of day.

10. The ICCBM system of claim 9, wherein the first output means for prompting the customer to schedule the time to call further includes a field for entry of a date.

11. The ICCBM system of claim 7, wherein the list of pre-existing contact numbers are organized into one or more groups of contact numbers associated with a customer account.

12. The ICCBM system of claim 11, wherein first output means further includes means for selecting an individual contact number from a single group.

13. The ICCBM system of claim 12, wherein first output means further includes means for manually entering the contact number of one or more call-receiving parties.

14. The ICCBM system of claim 13, wherein first output means further includes means for saving to the customer account the one or more contact numbers manually entered by the customer.

15. The ICCBM system of claim 11, wherein the first output means further includes group-click means for simultaneously selecting all of the contact numbers of a single group.

16. The ICCBM system of claim 11, wherein the first input means includes voice recognition means for receiving contact information of at least one call-receiving party.

17. The ICCBM system of claim 16, wherein the voice recognition means includes means whereby the customer may optionally select a group with a single voice command.

18. The ICCBM system of claim 7, wherein first output means further includes means for selecting the contact number associated with the audio communication device of the customer from a list of pre-existing contact numbers stored in an account associated with the customer.

19. The ICCBM system of claim 7, wherein system further includes means for automatically detecting the contact number of the audio communication device of the customer; the contact number of the audio communication device being provided by the first output means for selection by the customer.

20. The ICCBM method of claim 7, wherein:
   (a) the first output means further includes means for prompting the customer from the internet appliance to input a contact number for an audio communication device of at least one additional call-receiving party subsequent to the start of a conference call between the customer and two or more call-receiving parties;

(b) the first input means further includes means for receiving the contact information of at least one additional call-receiving party from the customer's internet appliance;

(c) the call enabling means further includes means for placing a telephone call to at least one additional call-receiving party subsequent to the start of a conference call between the customer and two or more call-receiving parties; and (d) the bridging means further includes means for bridging the telephone call to each additional call-receiving party with the customer and two or more call-receiving parties previously bridged.

21. A ICCBM system operably coupled by means of the Internet to an internet appliance of a customer, and further coupled to a public switched telephone network, the ICCBM system comprising:

(a) first output means for prompting the customer from the internet appliance to input:
  (i) a contact number for an audio communication device of one or more call-receiving party; said contact number being selected from a list of pre-existing contact numbers stored in an account associated with the customer at the ICCBM system; and
  (ii) a schedule time representing the time at which the ICCBM system is to call the customer;

(b) first input means for receiving the contact number of one or more call-receiving party from the customer's internet appliance, and schedule time;

(c) call enabling means for placing a telephone call to an audio communication device of the customer and a telephone call to each audio communication device of one or more call-receiving parties;

(d) bridging means for bridging the telephone call to the customer's audio communication device and to each audio communication device of each call-receiving party; wherein the customer and one or more call-receiving parties are in audio communication;

(e) call controlling means including a conference call interface, accessible from the customer's internet appliance, for monitoring the status of the calls to each call-receiving party; and (f) audio file switching means for transmitting an audio file to the audio communication device of one or more call-receiving parties.

22. The ICCBM system of claim 21, wherein the call enabling means further includes an interactive prompt for requesting authorization from the call-receiving party, without which the call is terminated.

23. The ICCBM system of claim 22, wherein the call enabling means further includes means for playing a pre-existing message inviting the call-receiving party to participate in a conference call.

24. The ICCBM system of claim 23, wherein the pre-existing message is recorded by the customer.

25. The ICCBM system of claim 21, wherein call controlling means includes a control permitting the customer to optionally place a party on hold.

26. The ICCBM system of claim 21, wherein call controlling means includes a control permitting the customer to mute a call to a party.

27. The ICCBM system of claim 21, wherein call controlling means includes a control permitting the customer to adjust the volume of a call to a party.

28. The ICCBM system of claim 21, wherein call controlling means includes a control permitting the customer to disconnect a party.

29. The ICCBM system of claim 21, wherein call controlling means indicates when a call to each call-receiving party is being dialed, connected, and disconnected.

30. The ICCBM system of claim 21, wherein system includes means for selecting and transmitting a pre-existing audio file to one or more call-receiving parties.

31. The ICCBM system of claim 21, wherein call controlling means includes means for monitoring usage of the conference call and telephonically alerting the customer of the usage.

32. The ICCBM system of claim 31, wherein the means for monitoring usage includes means for determining whether a prepaid account balance threshold has been triggered.

33. The ICCBM system of claim 21, wherein call controlling means indicates to the customer remaining number of minutes afforded by an account balance.

34. A ICCBM system operably coupled by means of the Internet to an internet appliance of a customer, and further coupled to a public switched telephone network, the ICCBM system comprising:

(a) first output means for prompting the customer from the internet appliance to input audio communication device contact numbers for at least two call-receiving parties; said contact numbers being selected from a list of pre-existing contact numbers stored at the ICCBM system, and organized into one or more groups in an account associated with the customer; the first output means including group-click means whereby a customer may simultaneously select all of the contact numbers of a single group;

(b) first input means for receiving the contact number of at least one call-receiving party from the customer's internet appliance;

(c) call enabling means for placing a telephone call to an audio communication device of the customer and a telephone call to each audio communication device of one or more call-receiving parties;

(d) bridging means for bridging the telephone call to each audio communication device of one or more call-receiving party; wherein the customer and one or more call-receiving parties are in audio communication; and (e) means for allowing a customer to select and the system to telephonically transmit a pre-existing audio file to the call-receiving parties.

35. The ICCBM system of claim 34, wherein the first output means further includes means for prompting the customer to schedule the time that the call enabling means is to place a call to the customer.

36. The ICCBM system of claim 35, wherein bridging means includes:

(a) first bridging means for bridging the first telephone call and a single call-receiving party; wherein an encoded audio signal generated by the customer's audio communication device is directed to the audio communication device of the call-receiving party, and an encoded audio signal generated by the audio communication device of the call-receiving party is directed to the customer's audio communication device; and (b) second bridging means for bridging the first telephone call and the telephone call to each audio communication device of two or more call-receiving parties; said second bridging means including decoding means, mixing means, and encoding means.

37. The ICCBM system of claim 36, wherein system further includes means for monitoring usage of the conference call and telephonically alerting the customer of the usage.

38. The ICCBM system of claim 14, wherein the means for monitoring usage includes means to determine whether a prepaid account balance threshold has been triggered.

39. A ICCBM method for bringing a customer with an internet appliance into telephonic communication with at least one call-receiving party having an audio communication device, the method comprising the steps of:
   (a) outputting to the internet appliance of the customer a list of pre-existing contact numbers;
   (b) receiving from a customer, by means of the internet appliance, the contact number of the audio communication device of one or more call-receiving party;
   (c) receiving from the customer, by means of the internet appliance, the contact number for the audio communication device of the customer;
   (d) placing a telephone call to an audio communication device of the customer;
   (e) placing a telephone call to the audio communication device of each call-receiving party;
   (f) bridging the calls to each call receiving party with the call to the customer;
   wherein the customer and a single call-receiving party are brought in telephonic communication by:
      (i) directing an encoded audio signal associated with the customer to the call-receiving party; and
      (ii) directing an encoded audio signal associated with the call-receiving party to the customer;
   wherein the customer and two or more call-receiving parties are brought into telephonic communication by:
      (iii) generating decoded audio signals by decoding the input encoded audio signal associated with each of the participants;
      (iv) generating mixed audio signals by summing the decoded audio signals such that each participant hears the audio signals associated with the other participants; and
      (v) generating output encoded audio signals by encoding each of the mixed audio signals associated with each participant, prior to transmission,
   (g) transmitting a pre-existing audio file to an audio communication device to at least one of the call-receiving parties.

40. The ICCBM method of claim 39, wherein the method further includes the step of outputting to the internet appliance of the customer a control panel interface with which the customer may optionally place a call-receiving party on hold and mute a call-receiving party.

41. The ICCBM method of claim 40, wherein the method further includes the step of outputting to the internet appliance of the customer the control panel interface displaying the dialing status and connection status of the calls placed to each call-receiving party.

42. The ICCBM method of claim 39, wherein the step of placing a telephone call to each call-receiving party further includes the step of providing an interactive prompt.

43. The ICCBM method of claim 42, wherein the calls placed with each of two or more call-receiving parties are bridged with the customer only after the party has responded to the interactive prompt.

44. The ICCBM method of claim 43, wherein the method further includes the steps of:
   (a) recording a conference call introduction by the customer; and
   (b) playing the introduction to each call-receiving party.

45. A ICCBM method for bringing a customer with an internet appliance and audio communication device into telephonic communication with at least one call-receiving party having an audio communication device, the method comprising the steps of:
   (a) outputting to the internet appliance of the customer a list of pre-existing, customer-defined contact numbers retrieved from the ICCBM system;
   (b) receiving from a customer, by means of the internet appliance, the contact number for the audio communication device of one or more call-receiving party;
   (c) receiving from the customer, by means of the internet appliance, the contact number for the audio communication device of the customer;
   (d) receiving from the customer, by means of the internet appliance, a schedule time representing the time at which the ICCBM system is to place the call to the customer;
   (e) placing a telephone call to the audio communication device of the customer at the time prescribed by the schedule time;
   (f) placing a telephone call to the audio communication device associated with each call-receiving party;
   (g) bridging the calls to each call receiving party with the call to the customer; wherein the customer and one or more call-receiving party are brought in telephonic communication; and
   (h) transmitting a pre-existing audio file to an audio communication device of at least one of the call-receiving parties.

46. The ICCBM method of claim 45, wherein the schedule time is in the form of a time delay between the time the instruction is placed and the call to the customer is placed by the ICCBM system.

47. The ICCBM method of claim 45, wherein the schedule time is in the form of a time of day at which the call to the customer is placed by the ICCBM system.

48. A ICCBM method for bringing a customer with an internet appliance and audio communication device into telephonic communication with at least one call-receiving party having an audio communication device, the method comprising the steps of:
   (a) outputting to the internet appliance of the customer a list of pre-existing, customer-defined contact numbers; the contact numbers being organized into one or more contact groups;
   (b) receiving from the customer, by means of the internet appliance, a selection of a contact group representing one or more call-receiving parties; the selection in response to the activation of a single hyperlink made available by the ICCBM system;
   (c) placing a telephone call to the audio communication device of the customer;
   (d) simultaneously placing a telephone call to the audio communication device associated with each call-receiving party, including the selected group;
   (e) bridging the calls to each call receiving party with the call to the customer;
   wherein the customer and one or more call-receiving party, including all contacts within a contact group, are brought in telephonic communication; and
   (f) transmitting a pre-existing audio file to an audio communication device of at least one of the call-receiving parties.

49. The ICCBM method of claim 48, wherein the method further includes the step of outputting to the internet appliance of the customer a means for the customer to manually enter a contact number associated with the audio communication device of one or more call-receiving party.

50. The ICCBM method of claim 49, wherein the method further includes the step of outputting to the internet appliance of the customer a means for the customer to individually select a contact number associated with the audio communication device of one or more call-receiving party from the list of pre-existing, customer-defined contact numbers.

51. A ICCBM method for bringing a customer with an internet appliance and audio communication device into telephonic communication with at least one call-receiving party having an audio communication device, the method comprising the steps of:
  (a) outputting to the internet appliance of the customer a list of pre-existing, customer-defined contact information including contact numbers;
  (b) receiving from a customer, by means of the internet appliance, the contact number for the audio communication device of one or more call-receiving party;
  (c) receiving from the customer, by means of the internet appliance, the contact number for the audio communication device of the customer;
  (d) placing a telephone call to the audio communication device of the customer;
  (e) outputting to the internet appliance of the customer a control panel interface with which the customer monitors the status of each telephone call to the audio communication device associated with each call-receiving party;
  (f) placing a telephone call to the audio communication device associated with each call-receiving party;
  (g) bridging the calls to each call receiving party with the call to the customer;
  wherein the customer and one or more call-receiving party are brought in telephonic communication; and
  (h) transmitting a pre-existing audio file to an audio communication device of at least one of the call-receiving parties.

52. The ICCBM method of claim 51, wherein the ICCBM method provides further optional steps including:
  (a) prompting the customer to input a contact number associated with an audio communication device of one or more additional call-receiving party;
  (b) placing a telephone call to the audio communication device of each additional call-receiving party; and
  (c) bridging the call to each of the additional call-receiving party with an existing conference call.

* * * * *